Nov. 11, 1930.   R. B. FAGEOL   1,781,631
VEHICLE SNUBBER AND SPRING SUSPENSION
Filed Oct. 11, 1927   4 Sheets-Sheet 1

Nov. 11, 1930. R. B. FAGEOL 1,781,631
VEHICLE SNUBBER AND SPRING SUSPENSION
Filed Oct. 11, 1927 4 Sheets-Sheet 2

Nov. 11, 1930.  R. B. FAGEOL  1,781,631
VEHICLE SNUBBER AND SPRING SUSPENSION
Filed Oct. 11, 1927  4 Sheets-Sheet 4

Patented Nov. 11, 1930

1,781,631

UNITED STATES PATENT OFFICE

ROLLIE B. FAGEOL, OF LOS ANGELES, CALIFORNIA

VEHICLE SNUBBER AND SPRING SUSPENSION

Application filed October 11, 1927. Serial No. 225,511.

This invention relates to vehicle spring suspensions and particularly pertains to snubbers or shock absorbers operating in conjunction with the vehicle springs, and the present application is a continuation in part of application Serial No. 141,924 filed October 16, 1926.

In the operation of vehicles and particularly automobiles in which it is common practice to support the frame from the running gear by interposing springs therebetween, it has been found that when the wheels of the running gear suddenly strike irregularities in the contour of the roadway, the weight of the vehicle would tend to continue in its general direction of travel and will cause the springs upon which it is supported to be violently deflected. It is intended that the deflection of the springs will absorb the shock and that a minimum amount of it will be transferred to the frame. In operation, however, the deflection of the springs is followed by a rebound as they tend to restore themselves to a normal position, and this rebound imparts a violent force to the automobile frame and body and imparts poor riding qualities to the vehicle, in addition to introducing heavy stresses and strains which tend to shorten its life.

Various devices have been proposed for checking the rebound of springs by clamping the spring leaves together such for example as disclosed in U. S. Patent 945,725 and French Patent 560,452, but such arrangements simply increase the frictional resistance between the spring leaves and as a result cause an undesirable stiffening of the spring action to initial deflection which is highly undesirable and renders them impractical for commercial purposes. Such devices do not oppose the deflecting action of different spring leaves in a manner to neutralize, to a large extent and check the undesirable rebounds as is the case with my invention and frequently harm rather than improve the spring action.

It is the principal object of the present invention to provide a vehicle shock absorber a snubber which will permit the downward deflection of the springs with substantial ease, but which will automatically build up resistance against and cushion the action of the springs in a manner to substantially neutralize and materially check the undesirable rebounds and thus increase the easy riding qualities of a vehicle. To accomplish this, the present invention contemplates the application of means to the leaves of a multiple-leaf spring which will yieldingly oppose relative endwise movement between the spring leaves without substantially restricting initial or comparatively small deflections of the spring as the vehicle moves over road irregularities.

Another object of the invention is to provide means to resiliently oppose the relative endwise movement and the straightening action of the leaves of a multi-leaf spring, that will yieldingly cushion against sharp blows imparted to the vehicle without substantially stiffening the spring under small deflection and that will be effective to check relative movement of the leaves.

Still another object of the invention is to provide a multi-leaf spring construction in which the movements of the spring as a whole in a direction endwise of the spring is resiliently resisted, as well as the movement of the individual leaves that go to make up the spring, thus providing means for cushioning brake and torque reactions as well as road impact.

A further object of the invention is to provide a multi-leaf construction in which resilient blocks are employed that contact directly with and grip the metal of the spring, the resilient blocks being of such character that they adhere to the metallic surfaces with which they contact to substantially prevent endwise movement of said metallic members with respect to the blocks with which they contact, and to set up a kneading action of the resilient material to cushion and absorb shocks.

A still further object of the invention is to provide a spring comprising a plurality of leaves connected to the vehicle frame by a swinging hanger embodying resilient blocks arranged to yieldingly resist relative endwise and straightening movement of the spring leaves as well as swinging movement of the ends of the spring assembly with the hanger to cushion torque and brake reactions as well as road shocks.

Still another object of the invention is to provide a multi-leaf spring construction connected to the frame by means of swinging hangers provided with resilient means to resist the swinging movement of the hangers, and automatically effective wedging means to increase the action of said resilient means in checking the swinging of said hangers as the amplitude of the movement increases.

Other objects of the invention are such as may be attained by a utilization of the various combinations, subcombinations and principles hereinafter set forth and as defined by the scope of the appended claims.

The invention is illustrated by way of example in the accompanying drawings, in which:

Figure 15ª is a partial side elevation of a modified form of connection shown in Figure 15.

Referring more particularly to the drawings:

10 indicates a vehicle main frame here indicated as being supported upon a front axle 11 and a rear axle 12. A front semi-elliptical spring 13 is interposed between the front axle 11 and the main frame while a rear semi-elliptical spring 14 is here shown as interposed between the rear axle and the frame. It will be understood, however, that the present invention is not limited to the use of semi-elliptical springs, but that other multiple-leaf springs may be used if desired. The present invention is intended to resist the rebound of the spring by checking the relative longitudinal movement between, and the straightening action of the leaves of a multiple-leaf spring and to secure this result in a yielding manner. One of the structures for accomplishing this result is shown in Figures 1 to 10 of the drawings, while modified forms are shown in Figures 11 to 23, inclusive.

Figure 5:
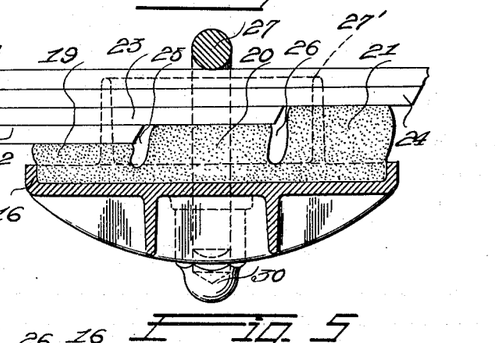
Figure 5 is a view in longitudinal section showing the snubber applied as viewed on the line 5—5 of Figure 4.
Figure 6:
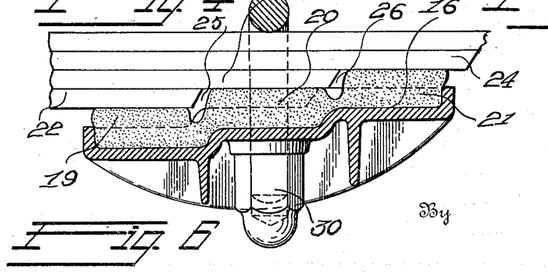
Figure 6 is a view in longitudinal section showing a modified form of the snubber structure.
Figure 7:
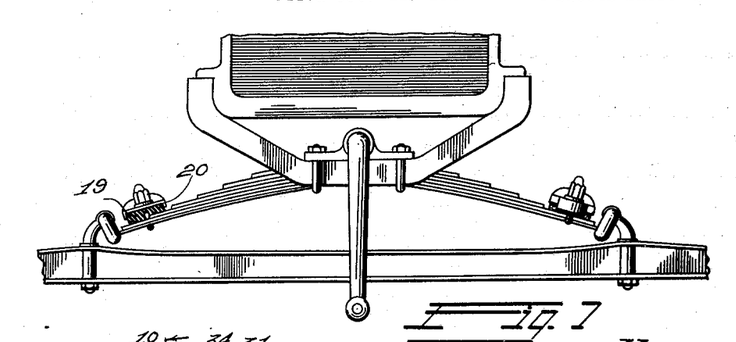
Figure 7 is a view in front elevation disclosing the application of the present invention to vehicle springs of the Ford type.

Referring particularly to Figures 1 to 10, inclusive, it will be seen that a fitting 15 is provided. This fitting comprises a base plate 16 which is bounded along its marginal edges by an up-turned flange 17, thus forming a rectangular pocket into which a resilient block 18 may be seated. The resilient block is formed with a plurality of steps, the number of which may be varied to suit requirements. However, in Figures 3 and 6 these steps are indicated as being three in number and are indicated by the reference numerals 19, 20 and 21. In Figure 7 of the drawing there are only two steps of the resilient block shown indicated by the numerals 19 and 20.

The block is preferably made of rubber which has considerable resilience. The rubber used in the manufacture of high grade solid truck tires having desirable characteristics. The steps or separate portions 19, 20 and 21 of the block vary in height in direct proportion to the variation in the thicknesses of the leaves of the spring. By particular reference to Figures 5 and 6 it will therefore be seen that in proper position on a spring the lower step will engage the spring leaf 22, the next succeeding step will engage the overhanging spring leaf 23, and the block portion 21 will engage the next succeeding overhanging leaf 24.

For reasons which will be hereinafter set forth, the portions of the block are preferably united or in intimate shock transmitting contact or union along their base portions and are separated above the base plate as indicated at 25 and 26. The plate 16 with block 18 seated thereupon is clamped against the graduated overlapping faces of the spring leaves by a U-bolt 27 as shown in Figures 4, 5, 6 and 7 of the drawings, while other clamping means are provided for the form shown in Figure 8 of the drawings. In any event, the clamp structure embraces the spring and places the portions of the resilient block under substantially uniform compression so that they will bear firmly against the respective spring leaves in such manner that the leaves cannot move substantially with respect to the surface of such portions. In actual practice it is found that said portions after being put in use adhere to and firmly grip the metal of the spring as though vulcanized thereto, after a short period of use; the surfaces of the pad in contact with the metal it will be noted being of substantial area. The shifting movement of the individual leaves in operation under load is thus resisted when the leaves are deflected, due to the firm engagement of the resilient blocks with the under faces of the leaves so that it is necessary for the leaves to distort the blocks and to move against the yielding resistance thus imposed. The fitting 15 is held in place and prevented from laterally shifting on the springs by means of side guides 27' and 28. These guides are here shown as being segments of a cylinder and as serving the dual purpose of centering the snubber block upon the spring and also neatly concealing the U-bolt 27 which extends downwardly along opposite sides of the spring and through the base of the fitting 15.

Figure 1:
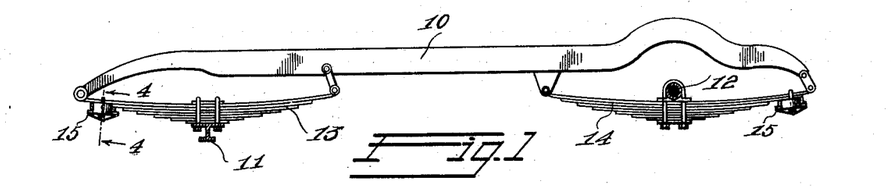
Figure 1, is a view in side elevation showing the vehicle frame equipped with semi-elliptical front and rear springs and further provided with the snubbers with which the present invention is concerned
Figures 2, 3:
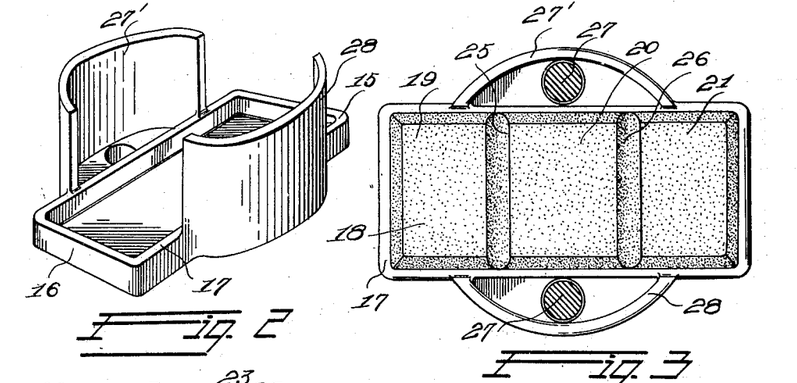
Figure 2, is an enlarged view in perspective showing the fitting of the snubber.
Figure 3 is an enlarged view in plan showing the snubber fitting with the resilient block applied thereto and further disclosing the fastening bolt in section.
Figure 4:
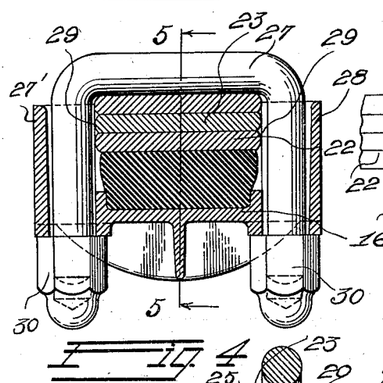
Figure 4 is an enlarged view in transverse section through the snubber as seen on the line 4—4 of Figure 1.

By reference to Figure 4 of the drawing it will be seen that the vertical edges 29 of the guides 27' and 28 extend parallel to each other and along opposite sides of the spring leaves where they are held when the U-bolts are clamped in position. The U-bolts are preferably fitted with relatively long acorn nuts 30 which are threaded a sufficient distance to permit considerable take-up to be had when adjustment is required. It will also be understood that the fitting 15 is suitably webbed and braced so that there will not be any breaking strain imposed upon the fitting by the tension of the tightened U-bolt or other action incident to the operation of the springs.

In the form of the invention shown in Figure 6 of the drawing, the base plate 16 is stepped correspondingly with the variation in height of the faces of the resilient blocks and in this manner some of the resilient material is conserved. As the blocks are of substantial thickness the U-bolts will not be effective to unduly restrict the flexibility of the spring by clamping the leaves of the spring so tightly against each other that great frictional resistance is set up between the spring leaves. The snubbing action of the resilient block is primarily brought about by individually yieldingly resisting the endwise movement of the spring leaves and the straightening action of the leaves without clamping the leaves together so tightly as to destroy the desirable action if the spring as a whole in its initial deflection.

By referring to Figure 7 of the drawing, it will be seen that a snubber is provided of relatively short dimension, since in application upon the Ford model T type of car it is only necessary to act against two springs. It will be found apparent that since the graduated springs are reversed in position as compared with the multiple-leaf springs shown in Figure 1 of the drawings, the snubber block will of necessity be reversed and will be placed upon the top of the spring.

Figure 8:
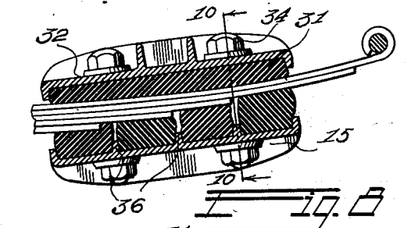
Figure 8 is a view in longitudinal section through a form of the invention designed to be used with cars of heavy load capacity.
Figure 9:
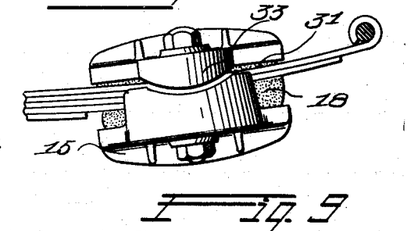
Figure 9 is a view in side elevation showing the structure of Figure 8.
Figure 10:
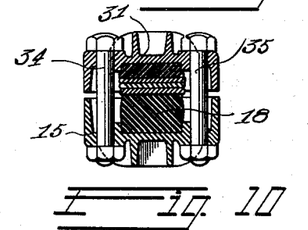
Figure 10 is a view in transverse section on line 10—10 through the structure shown in Figure 8.

In the use of the present invention with springs designed for heavy duty, it has been found desirable to create a yieldable pressure upon opposite sides of the spring. For that reason, an auxiliary resilient pad 31 is mounted upon the upper long-leaf of the spring and is held in position by a clamping plate 32. This plate is formed with overhanging side members 33 agreeing substantially in form and dimensions with the members 27' and 28 of the lower fitting and serving the same purpose in that the fitting and plate will be held against lateral twisting movement. By the use of the fitting 15 and the plate 32 it is possible to eliminate the U-bolt 27 and to provide a pair of straight bolts 34 and 35, which pass down through the members and along opposite sides of the spring. Attention is further directed to the fact that if desired the blocks may be completely separated and spaced apart by webs 36 formed in the fitting 15.

Figure 11:
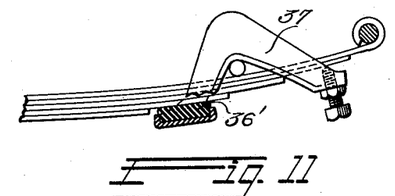
Figure 11 is a view in section and side elevation showing the application of the resilient block to another form of snubber.
Figure 12:
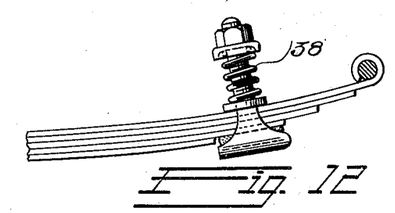
Figure 12 is a view in side elevation showing the application of the resilient block to a compression spring form of snubber.
Figure 13:
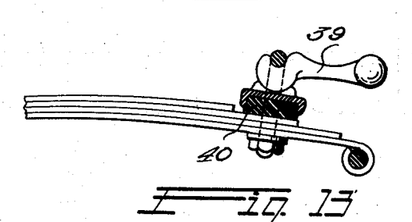
Figures 13 and 14 are views in section and side elevation showing the application of the resilient pad to gravity operated shock absorbers.
Figure 14:
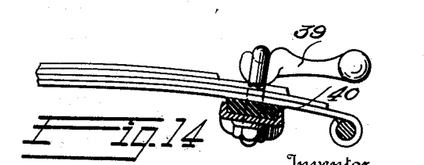

In the form of the invention shown in Figure 11, a resilient block 36' is disclosed as being interposed between one arm of a clamp member 37 and the face of a spring leaf. This clamping device is mounted upon the spring in a manner to create a firm contact between two of the leaves. In the structure shown in Figure 12 substantially the same thing is true with the addition that a resilient spring 38 is clamped against the leaf on one side and holds a block of resilient material firmly against one of the leaves on the opposite side of the spring to restrict its endwise movement. Figures 13 and 14 show a modification of the invention in which a gravity operated pendulum member 39 swings downwardly on rebound in the car to increase the pressure between the block 40 and the leaves, and this member thus cooperates with the resilient block to increasingly resist the shifting movement of the leaves on rebound of the springs.

In operation of the present invention so far as described the snubber is applied to the spring in a manner best suited to the design of the spring and the load intended to be carried thereby. It has been found in practice that it is desirable to place the snubber on the outer halves of the springs extending from the axles to the spring horns and it has also been found desirable to place the snubber of the front springs at a point closer to the ends of the springs than the snubbers are placed on the rear springs. It will thus be apparent that experiments have proven that variation in action may be obtained by varying the relative positions of the snubbers in their application upon the springs. In the form of the invention shown in Figures 1 to 10, inclusive, the faces on the spring leaves against which the resilient blocks are to bear are first thoroughly cleaned so that the flat surfaces of the blocks which it will be noted are of substantial area, will rest firmly thereagainst, after which the snubbers are applied and clamped to a desired tension by the U-bolts 27 or the bolts 34 and 35. In practice it is found that after the spring blocks have been thus clamped against the face of the springs, they will frictionally engage the same and normal operation of the spring will not cause any relative movement between the faces of the spring blocks and the spring leaves against which they are clamped as above pointed out. It is to be understood that the bolts create a desired compression of the resilient blocks which will of necessity slightly deform the blocks as indicated in Figure 5 of the drawing. By this constant yielding pressure, the springs against which the resilient blocks rest, as well as all of the springs embraced by the U-bolts or the plate and bolts of Figure 10, will be clamped together in a mass which will permit them to slide relative to each other and to straighten during deflection of the spring, but against yielding resistance caused by the resilient blocks bearing thereagainst. When a spring is deflected, therefore, on the down stroke, the weight of the car will overcome the friction existing between leaves and will cause the spring to readily deflect under the shock of impact. As the spring leaves deflect the endwise movement thereof will roll or knead the sections of the resilient block, while as the leaves straighten the sections of the block will be compressed, the increased pressure being transmitted through the resilient block sections simultaneously in opposition to each other resulting in increasing absorption and neutralization of the energy of impact as the deflection of the spring increases, with a result that a desirable cushioned deflection of the spring is secured which permits substantially free deflection for the smaller ranges of movement, while for the sharp road impacts causing excessive deflection the energy of impact is absorbed and neutralized in a manner to retard and cushion the deflection rebound of the spring and cause it to return to its normal position with a minimized shock to the frame.

In the forms of the invention shown in Figures 11 to 14 inclusive, due to the use of the yielding block initial and small deflections are permitted with substantial freedom, and excessive movements are checked but these forms are not as desirable in their action as the forms of the invention herein before described.

Figures 15, 16, 18, 19:
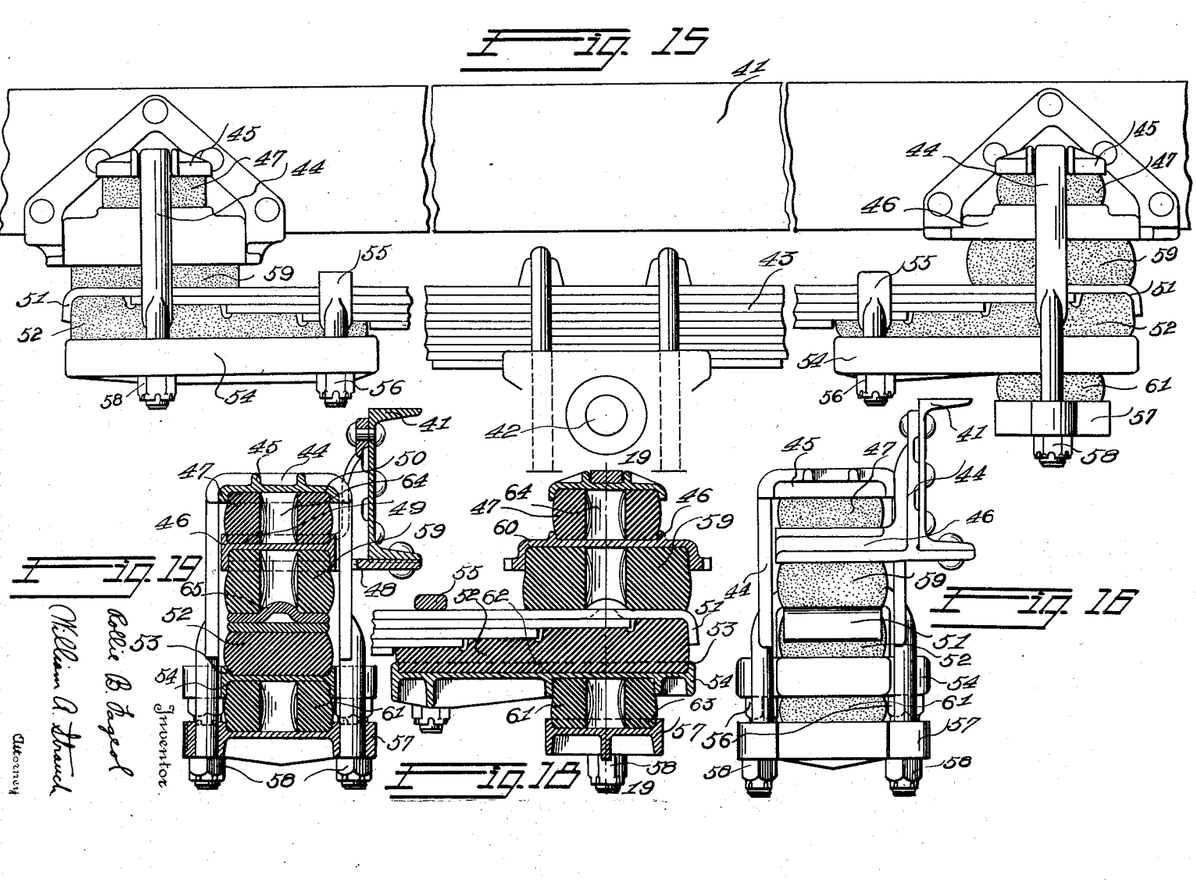
Figure 15 is a side elevation of a further modification of my invention embodying resilient blocks to yieldingly resist endwise movement of the springs relative to the frame.
Figure 16 is an end view of the construction shown in Figure 15.
Figure 18 is a vertical section taken on the plane indicated by the line 18—18 on Figure 17.
Figure 19 is a vertical section on the plane indicated by the line 19—19 on Figure 18.

This invention may readily be applied in connection with springs that are secured to the vehicle frame by connections including resilient blocks between which the ends of the spring assembly can move as the springs deflect in accordance with road irregularities and torque and brake reactions. One form of this construction is shown in Figures 15, 16, 17, 18 and 19 in which 41 indicates the frame of the vehicle 42 the axle, and 43 the usual spring assembly, comprising a plurality of spring leaves that are provided to yieldingly support said frame on said axle. The ends of the spring assembly are connected to the frame 41 by means of hangers 44 adapted to yield or spring slightly and of U-form that preferably embrace a clip seat 45 that is spaced from a hanger bracket 46 by a resilient block 47. As shown in Figure 19, the hanger bracket 46 is perforated at 48 to permit one arm of the U-shaped hanger 44 to pass therethrough. As shown in the same figure the hanger bracket is provided with a seat 49 in the form of a recess to receive the resilient block 47, the under surface of clip seat 45 being provided with a similar recess 50 to receive said block.

The upper leaf of the spring assembly 43 is preferably turned down at its ends as shown at 51 and engaging the ends of a plurality of the leaves of said assembly is a resilient block 52 having stepped portions as above described. The resilient block 52 is arranged in a recess forming a seat 53 in a seat member 54 that is clamped to the spring assembly by a U-bolt 55, the clamping force being adjustable by means of the castellated nuts 56. As shown in Figure 15, bolt 55 is arranged adjacent the end of the seat 54 that is remote from the end of the spring assembly.

The end of the spring assembly with the rubber blocks 52 secured thereto in the manner just described is arranged between the arms of hanger 44 and is clamped against the under surface of hanger bracket 46 by means of a yoke 57 that is slidably mounted on the arms of said clip and adjusted by means of nuts 58. Arranged between the ends of the assembly just referred to and the spring hanger are resilient blocks 59 each of which is preferably seated in a recessed seat 60 provided in the under surface of the hanger bracket 46. Arranged between the assembly just referred to and the yoke 57 is a resilient block 61 that is held from lateral movement by being seated in a recess 62 in seat 54 and by being seated in a recess 63 in yoke 57.

The resilient blocks 47, 52, 59 and 61 are preferably made of a high-grade rubber preferably of the type used in solid truck tires, and in order to increase their resilience in planes extending substantially parallel to the vehicle frame, such blocks are preferably provided with a longitudinal bore 64 or other suitable means to increase the resilience of the blocks in the direction just referred to. In order to positively prevent endwise movement of the top spring of the spring assembly relative to the block 59, said leaf may be provided with a protuberance 65 engaging the bore 64 in block 59.

As shown in Figure 15, both ends of spring assembly 43 are secured to the frame of the vehicle through resilient spacing blocks. As shown in this figure the block 61 and yoke 57 may be omitted at one end of the spring assembly and the nuts 58 that adjust the effective length of the clips may engage the under surface of seat 54. In order to positively prevent relative movement between the ends of the several leaf springs engaged by the block 52, the ends of said leaves may be turned at right angles and embedded in the block as shown at 66 in Figure 15ª.

Figures 15A, 20:
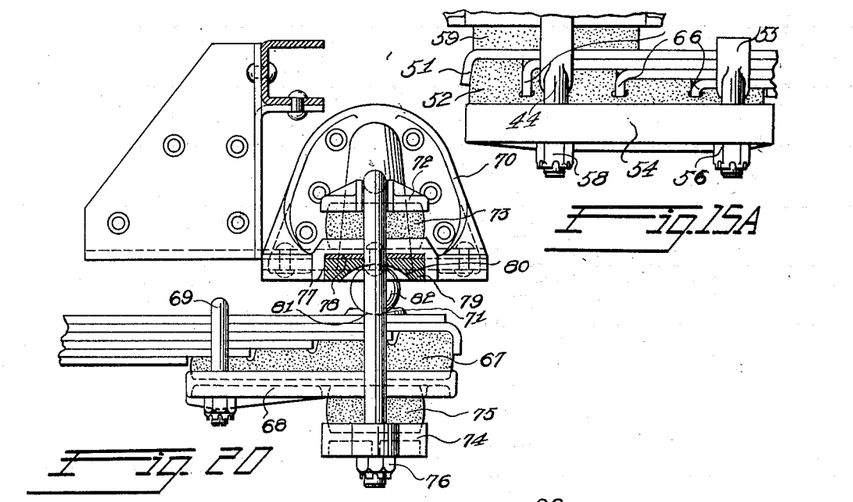
Figure 20 is a side elevation of a further modification embodying wedging means that becomes automatically effective to press the resilient blocks upon substantial swinging movement of the spring hanger.

In Figure 20 still another modification of this invention is shown. This modification includes a resilient snubber block 67 secured to the ends of the spring assembly by a seat 68 and a U bolt 69 after the manner just described in connection with the construction shown in Figure 15. The spring and snubber block assembly just described is secured to the bracket 70 of the frame of the vehicle by means of hanger 71, hanger seat member 72 and resilient block 73 serving to resiliently support the end of hanger 71 from the frame.

A yoke 74 separated from the assembly just referred to by a resilient block 75 supports said assembly nuts 76 being used to vary the effective length of the hanger arms as in the form shown in Figure 15. The bracket 70 is provided with a recess 77 that is provided with a liner 78 of resilient material, such as rubber. Arranged on said liner in recess 77 is a hardened steel ball seat 79 provided with a concavity 80.

The uppermost leaf of the spring assembly is provided with a concavity 81, the vertical axis of which is in substantial alinement with the concavity 80 just described. A ball 82 is arranged between seat 79 and the uppermost leaf of the spring assembly, the nuts 76 being adjusted to clamp the ball so that it rests in concavities 80 and 81, in firm contact with the lowermost points thereof.

In the form of the invention shown in Figures 15 to 20 it will be observed that the spring assemblies are attached to the frame in a manner avoiding the use of free swinging shackles that permit a certain amount of unresisted endwise movement of one end of the spring assembly relative to the frame. In the construction shown in said figures the endwise movement of the spring as a whole is variably resisted by the resilient blocks 61 and 59 since as hangers 44 spring or deflect under load the blocks will be pinched and the pressure increased with increased deflection, as the blocks are rubber as above stated, and contact directly with the metallic surfaces against which they abut, it is found in practice that the rubber adheres to the metal surfaces due to the heat generated when the blocks are put in service, thus virtually vulcanizing the rubber and causing a firm contact between the metallic surfaces and the blocks. Accordingly lateral movement of blocks relative to their supporting surfaces does not take place under conditions of service and movements of the ends of the spring assembly as a unit are resisted by the kneading or rolling of the body of the rubber blocks, the resilience of which is increased by the bores 64 as well as by the pinching action of the hangers under deflection. In this way the action of the spring assembly as a whole is resiliently controlled by said blocks.

At the same time, the deflection of the spring, which causes a relative endwise movement between the leaves constituting the spring assembly is resisted by the block 52 because no movement of any of the leaves with respect to the surfaces of the block 52 with which it contacts takes place, since in practice it is found that leaves adhere to the portion of the block with which they contact, thereby preventing such movement. The blocks 52 accordingly, yieldingly resist deflection of the springs as above set forth in connection with Figures 1 to 10. In this way, the block 52 also acts as an effective snubber, absorbing in large measure, the undesirable forces that would otherwise be applied to the frame of the vehicle.

It should be noted further that by avoiding the use of the customary shackles, the driving force that impels the vehicle forward and the braking reactions usually transmitted through the springs and through the spring connections to the body, are transmitted to the frame through the resilient blocks interposed between the springs and the frame. Accordingly, the driving force and braking reaction are cushioned by said blocks and the torque reactions that tend to rotate the spring assembly as a unit about the axis of the axle, are yieldingly resisted by the resilient blocks that are utilized in connecting the springs to the frame.

In the form shown in Figure 20, the ball 82 serves to restore the hanger to its substantially vertical position when it is caused to substantially depart therefrom by the action of the spring assembly as a whole. When such action occurs, the cavity 81 moves to one side of the position in which its vertical axis is in alinement with the vertical axis of cavity 80, thus causing the ball 82 to become wedged. In such position the ball tends to aline the cavities 80 and 81 and thus restore the parts to normal condition, while at the same time the wedging action of the ball increases the pressure on the blocks aiding the checking of excessive movements.

Figures 17, 21, 22, 23:
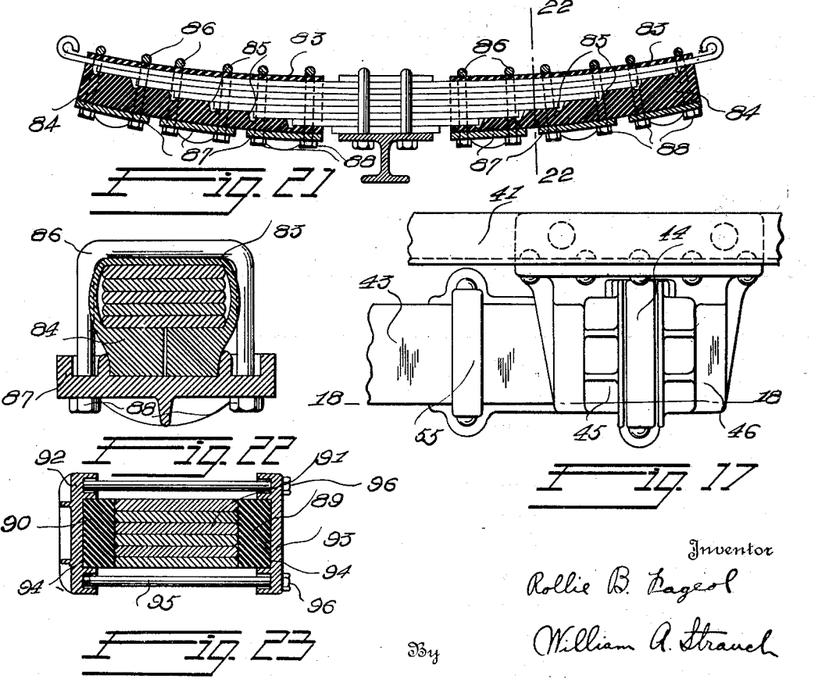
Figure 17 is a plane view of a portion of the construction shown in the same figure.
Figure 21 is an elevation of a further modification of this invention, the snubber blocks of this invention being embodied in this figure as a part of a spring cover.
Figure 22 is a vertical section taken on the plane of the line indicated by 22—22 in Figure 21.
Figure 23 is a cross-sectional view showing the application of the invention to the sides of a multi-leaf spring assembly.

A still further modification of the invention is shown in Figures 21 and 22. In these figures, the improved means for snubbing the action of the spring is embodied as a part of a rubber case that completely encloses the ends of the spring assembly. In these figures the rubber case comprises a relatively thin body portion 83 and thickened end portions 84 so proportioned that when the case is arranged in position around the spring assembly, the thickened ends will engage the underside of the spring while the body 83 will completely surround and encase the spring leaves. The thickened ends 84 are provided with step portions 85 arranged to engage the projecting portions of the spring leaves to function in the manner above described in connection with similarly formed snubbing blocks. In order to firmly press said stepped end portions into contact with the leaf ends, U-bolts 86 are provided with recessed seats 87 that receive said end portions and prevent lateral movement thereof. Nuts 88 may be used to adjust the pressure upon end portions 84. This form of the invention functions after the manner above described in connection with the other modifications, the step portions of the thickened ends of the case serving to yieldingly resist relative endwise movement between the leaves and the spring assembly.

In Figure 23 a still further modification is shown in which the snubbing blocks 89 and 90 engage the sides of a multi-leaf spring 91. Suitably formed seat members 92 and 93 provided with recesses 94 that serve as seats for said blocks, are caused to press the blocks against the sides of the spring by means of a U-bolt 95 and nuts 96. In this form of the invention the blocks 89 and 90 function to prevent relative movement between the spring leaves by being pressed firmly in contact therewith by the U-bolt 95. Said bolt is not effective to increase the frictional resistance between the leaves of the spring since the clamping pressure is applied in a direction transverse to the spring. The action of the spring is accordingly substantially unaffected by said blocks except for the checking of excessive movements and the rebounds of the spring. It will thus be seen that the devices here disclosed provide simple structures adapted to be mounted upon the multiple leaves of vehicle springs without alteration or replacement of parts. and which will act to create positive and desirable cushioning of spring action and movement as a whole thereby increasing the riding qualities of the car and eliminating objectionable vibration which would otherwise be imparted to the parts of the vehicle structure.

The invention may obviously be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Accordingly what is desired to be secured by Letters Patent and is claimed as new is:

1. A vehicle including a multi-leaf spring, a resilient block arranged adjacent each end of the spring and directly contacting with relatively movable leaves of said spring, means to secure said blocks to said spring so that said blocks are effective to yieldingly resist relative longitudinal movement of the spring leaves, and means engaging said last named means to secure said spring to the vehicle.

2. The combination defined in claim 1, in which the last named means includes resilient blocks that have a substantial degree of lateral flexibility endwise of the springs.

3. A vehicle including a multi-leaf spring, a resilient block having separate portions to directly contact with a plurality of the leaves of said spring, means to secure said spring to the vehicle, said means being arranged to be effective through said block and serving to firmly press said portions in contact with said leaves.

4. A vehicle including a multi-leaf spring and means to secure said spring to said vehicle, comprising hangers and a plurality of resilient blocks arranged between the spring ends, and put under compression by said hangers, one of said blocks firmly engaging a plurality of the spring leaves so that it resiliently opposes relative endwise movement of said leaves.

5. A vehicle including a multi-leaf spring having a resilient snubbing block engaging overlapped leaves secured to each end thereof, a plurality of spring supports carried by the vehicle frame and hangers to suspend the ends of said spring from said supports, and resilient blocks between said hangers and supports and between said spring ends and supports, said blocks being placed under substantial compression by said hangers.

6. A vehicle comprising a frame, a plurality of spring supports on said frame, a multi-leaf spring, means to secure said spring to said supports, said means including resilient blocks arranged above said support, between said support and spring ends, and beneath a plurality of lapped leaves of said spring ends, and elements to compress said resilient blocks and firmly secure said springs to the vehicle.

7. The combination defined in claim 6, in which said blocks are made of rubber that are provided with means to increase the inherent lateral flexibility thereof.

8. A vehicle comprising a frame, a spring support carried by the frame, a multi-leaf spring, a spring hanger to suspend said spring from said support, said hanger being arranged to swing endwise of the spring, and means to resist said endwise swinging movement comprising a plurality of resilient blocks engaging said spring, one of said blocks being arranged to contact a plurality of lapped leaves to yieldingly resist a relative endwise movement of the spring leaves.

9. A snubber for a multiple leaf vehicle spring embodying a plurality of leaves of varying lengths, the shorter leaves being free at their ends, comprising a resilient block contacting with a shorter leaf over a part of its length as great as the width of said leaf, and means to yieldingly clamp said block into firm adherent contact with said leaf so that relative endwise movement of said leaf is yieldingly resisted and cushioned by a kneading of the material of said resilient block without preventing such endwise movement and thus reducing substantially the freedom of the spring to deflect under conditions of service.

10. The combination defined in claim 9 in which said block is shaped to contact with a plurality of shorter leaves of the spring.

In testimony whereof I affix my signature.

ROLLIE B. FAGEOL.